(12) United States Patent
Weiss

(10) Patent No.: US 7,703,584 B2
(45) Date of Patent: Apr. 27, 2010

(54) DIVIDED DISK BRAKE ARRANGEMENT

(76) Inventor: Wolfgang Weiss, Daimlerstrasse 15, Ottobrunn (DE) DE-85521

( * ) Notice: Subject to any disclaimer, the term of this patent is extended or adjusted under 35 U.S.C. 154(b) by 0 days.

(21) Appl. No.: 10/973,830

(22) Filed: Oct. 25, 2004

(65) Prior Publication Data

US 2006/0086578 A1 Apr. 27, 2006

(51) Int. Cl.
*F16D 65/12* (2006.01)
*F16D 65/00* (2006.01)

(52) U.S. Cl. ............................... 188/218 XL; 188/72.7

(58) Field of Classification Search .............. 188/71.8, 188/72.7, 79.52, 218 XL, 18 A
See application file for complete search history.

(56) References Cited

U.S. PATENT DOCUMENTS

| | | | | |
|---|---|---|---|---|
| 4,018,311 | A | * | 4/1977 | Tickle ................... 188/218 XL |
| 4,280,598 | A | * | 7/1981 | Pollinger ............... 188/218 XL |
| 4,281,745 | A | * | 8/1981 | Wirth ................... 188/218 XL |
| 5,360,087 | A | | 11/1994 | Wiebelhaus et al. |
| 6,116,386 | A | * | 9/2000 | Martin ................. 188/218 XL |
| 6,119,827 | A | * | 9/2000 | Militello et al. ....... 188/218 XL |
| 6,438,813 | B1 | * | 8/2002 | Bernhard ..................... 29/39 |

FOREIGN PATENT DOCUMENTS

| | | |
|---|---|---|
| DE | 2906589 A1 | 8/1980 |
| DE | 3119913 A1 | 12/1982 |
| DE | 4106808 A1 | 9/1992 |
| EP | 0065312 B1 | 11/1982 |
| WO | WO 98/48194 A1 | 10/1998 |

* cited by examiner

*Primary Examiner*—Melody M Burch
(74) *Attorney, Agent, or Firm*—Townsend and Townsend and Crew, LLP

(57) ABSTRACT

A divided disk brake arrangement has a braking disk (13) with braking surfaces (11), and a disk holder (12), which is connected in a torsion-proof manner to the braking disk (13) and secured by a screw connection. The disk holder (12) and the braking disk (13) are mounted so that they can move relative to each other in the radial direction to compensate for different thermal expansions. At least one conical surface (18; 21) is provided in the region where the screw connection bears against the braking disk (13).

19 Claims, 3 Drawing Sheets

Fig. 3A
(PRIOR ART)
Fig. 3B
(PRIOR ART)
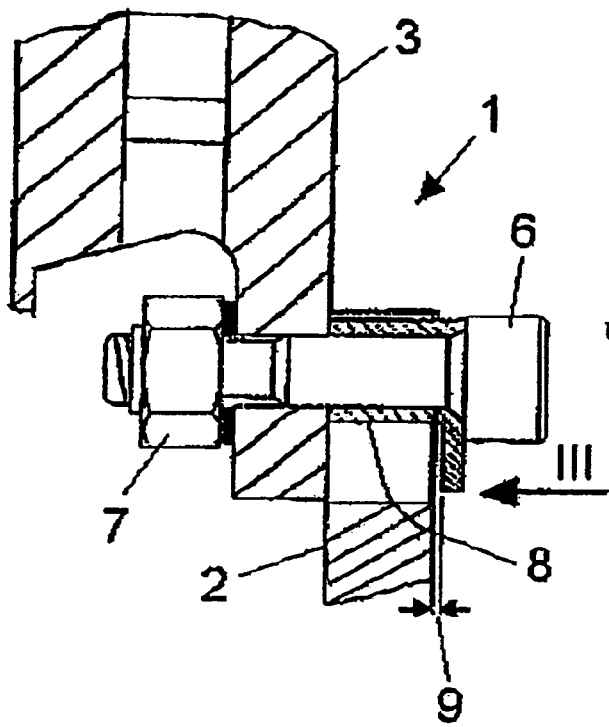
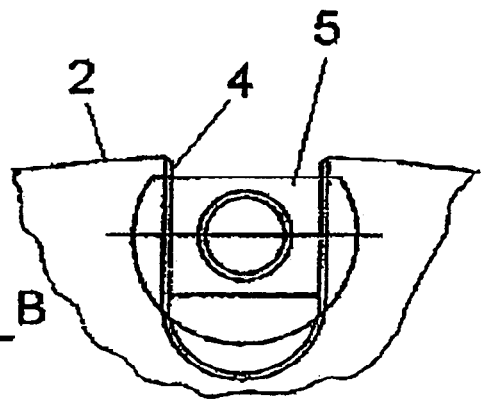
Fig. 4
(PRIOR ART)
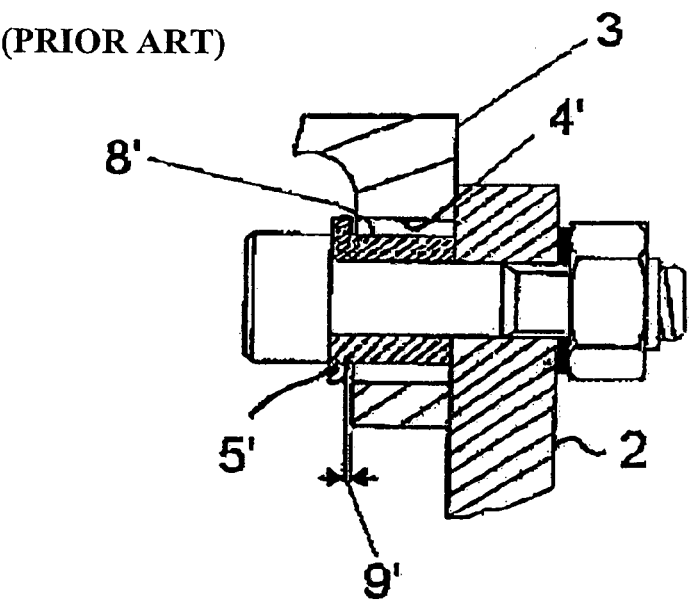

DIVIDED DISK BRAKE ARRANGEMENT

BACKGROUND OF THE INVENTION

The invention concerns a divided disk brake arrangement having a disk with braking surfaces and a disk holder which is non-rotatably connected to the disk brake and secured by a screw connection. The disk holder and the braking disk are mounted so that they can move relative to each other in the radial direction in order to compensate for thermal expansion differences.

Divided disk brake arrangements are known from motor sports and sports cars, and they use braking disks made of a highly heat-resistant and abrasion-resistant material such as a carbon fiber material, for example, while the disk holder is made from a light metal such as aluminum.

Since the materials of the disk and the disk holder have different coefficients of thermal expansion, and since in use the disk brake arrangement can be subjected to temperature fluctuations of several hundred degrees Celsius, the disk and the disk holder expand by different amounts. Such different thermal expansions require that the connection between disk holder and braking disk allow these two parts to expand relative to each other.

To permit such expansion, it is possible to secure the disk holder in floating manner on the braking disk, or to secure the braking disk in floating manner on the disk holder. Both of these known measures are illustrated in FIGS. 3A, 3B and 4.

FIGS. 3A and 3B show a known divided disk brake arrangement 1 that rotates about an axis of rotation A and floatingly mounts a disk holder 2 on a braking disk 3. Disk holder 2 has U-shaped radial recesses 4 arranged along its periphery. A radially movable slide bush 5 is inserted in each recess. A screw 6 extends through a borehole in slide bush 5 and a borehole in the braking disk 3 and is tightened against disk 3 with a nut 7. The slide bush 5 has a section 8 for disk holder 2 which is slightly wider than the thickness of the holder (in the cold state) to create free play 9 that permits axial expansion.

In the alternative known configuration illustrated in FIG. 4, a radially enlarged hole 4' is provided in braking disk 3 that receives a slide bush 5'. In this solution, the relative radial movement between disk holder 2 and braking disk 3 is permitted by hole 4' in brake 3. Here as well, section 8' of the guide bush 5' for disk brake 3 is slightly larger than the thickness of the disk in the region of hole 4' (in the cold state), so that here as well a play 9' is provided for axial thermal expansions.

The play permitting axial thermal expansions causes wear and tear during operation, since the play not only enables thermal expansions, but also leads to relative movements between guide bush 5 or 5' and disk holder 2 or braking disk 3 at low temperatures.

SUMMARY OF THE INVENTION

It is therefore an object of the present invention to provide a divided disk brake arrangement which forms a connection between the disk holder and the braking disk that is free of play, or in which play is at least substantially reduced in spite of different thermal expansions.

Providing at least one conical surface on the side of the disk holder facing the braking disk in the region where the screw connection bears on the braking disk means that the bearing region of the connection permits relative movements along the conical surface between the braking disk, the disk holder and the screw connection in a radial direction due to the different coefficients of thermal expansion between the disk and the holder. As a result, the axial spacing between the bearings of the screw connection also changes, and the thermal expansion of the braking disk and the disk holder in an axial direction is also compensated. Thus, during thermal expansions the pretensioning of the screw connection in the longitudinal direction of the screw also remains constant.

Especially preferred is a conical configuration of the region of the disk brake serving as a bearing for the screw connection.

Preferably, the screw connection is formed by a tensioning screw, which extends through the disk holder and the braking disk. In this configuration, the disk holder and the braking disk can move freely in the axial direction along the screw shaft.

It is further preferred to provide a tensioning ring on the side of the braking disk facing axially away from the disk holder and to connect the disk holder to the tensioning ring with tensioning screws to thereby clamp the disk between the disk holder and the tensioning ring. The tensioning ring distributes the pressure applied by the screws over the entire periphery of the disk holder to thereby reduce localized high pressure points. Moreover, when heated, the tensioning ring is subject to a corresponding radial expansion.

It is preferred that the disk holder, the tensioning ring and the screws are made from the same material. This has the advantage that their coefficient of thermal expansion is the same, so that heat-related expansions of the disk brake holder, the screws and the tensioning ring cause a parallel movement of the screw connection when heated or cooled.

In an especially preferred embodiment, a conical annular surface is provided in the region of the braking disk which is contacted by the tensioning ring. As a result of the distribution of the pressure exerted by the tensioning ring on the braking disk over the entire peripheral region of the tensioning ring, a substantially uniform pressure is obtained between the tensioning ring and the conically configured portion of the disk. The desired relative radial movement between tensioning ring and disk brake during thermal expansion is therefore as uniform as possible and is not subject to major differences in local frictional resistances.

As an alternative or in addition, the portion of the tensioning ring in contact with the braking disk is also a conical annular surface.

The angular inclination of the conical surface relative to the rotational axis of the disk brake arrangement is preferably defined by a line which extends from the point of intersection of the contact plane between the disk holder and the braking disk with the axis of rotation and the point where the axis of the tensioning screw intersects the conical surface.

An especially advantageous further modification of the divided disk brake arrangement of the present invention provides the braking disk with a first radial spur gear toothing and the disk holder with a cooperating second spur gear toothing which mesh with each other so as to transmit torque from the braking disk to the disk holder. Due to this gear connection, an optimal torque transmission from the braking disk to the disk holder is achieved during braking, without involving the screw connection in the flow of torque. As a result, no shear forces act on the screw connection.

In an especially preferred embodiment, the spur gearing is a crown gear with radially conical teeth. Such crown gearings are known as a Hirth gearing, or a Voith-Hirth gearing, and are described, for example, by Niemann (Niemann, G.: Maschinen Elemente, Vol. I, $2^{nd}$ edition, Berlin, Heidelberg, N.Y. 1975, pp. 381-383). With this type of gearing, the meshing teeth automatically center the respective parts.

Preferably, a plurality of teeth are merged into a block tooth. Large block teeth, as opposed to the individual teeth provided in typical Hirth gearing, simplify the fabrication and therefore lower manufacturing costs, and they also increase the strength of the gearing for the transmission of torque.

It is especially advantageous when the angular inclination of the conical surface relative to the rotational axis of the disk brake arrangement is defined by a line connecting the midpoint of the intermeshing spur gearings and the point where the axis of the tensioning screw intersects the conical surface.

BRIEF DESCRIPTION OF THE DRAWINGS

FIG. 3A is a lengthwise section through a cutout of a divisible disk brake arrangement made according to the prior art;

FIG. 3B is a side view of the known disk brake arrangement of FIG. 3A taken in the direction of arrow IIIB; and FIG. 4 is a lengthwise section through a cutout of another known divided disk brake arrangement.

DESCRIPTION OF THE PREFERRED EMBODIMENTS

Figure 1:
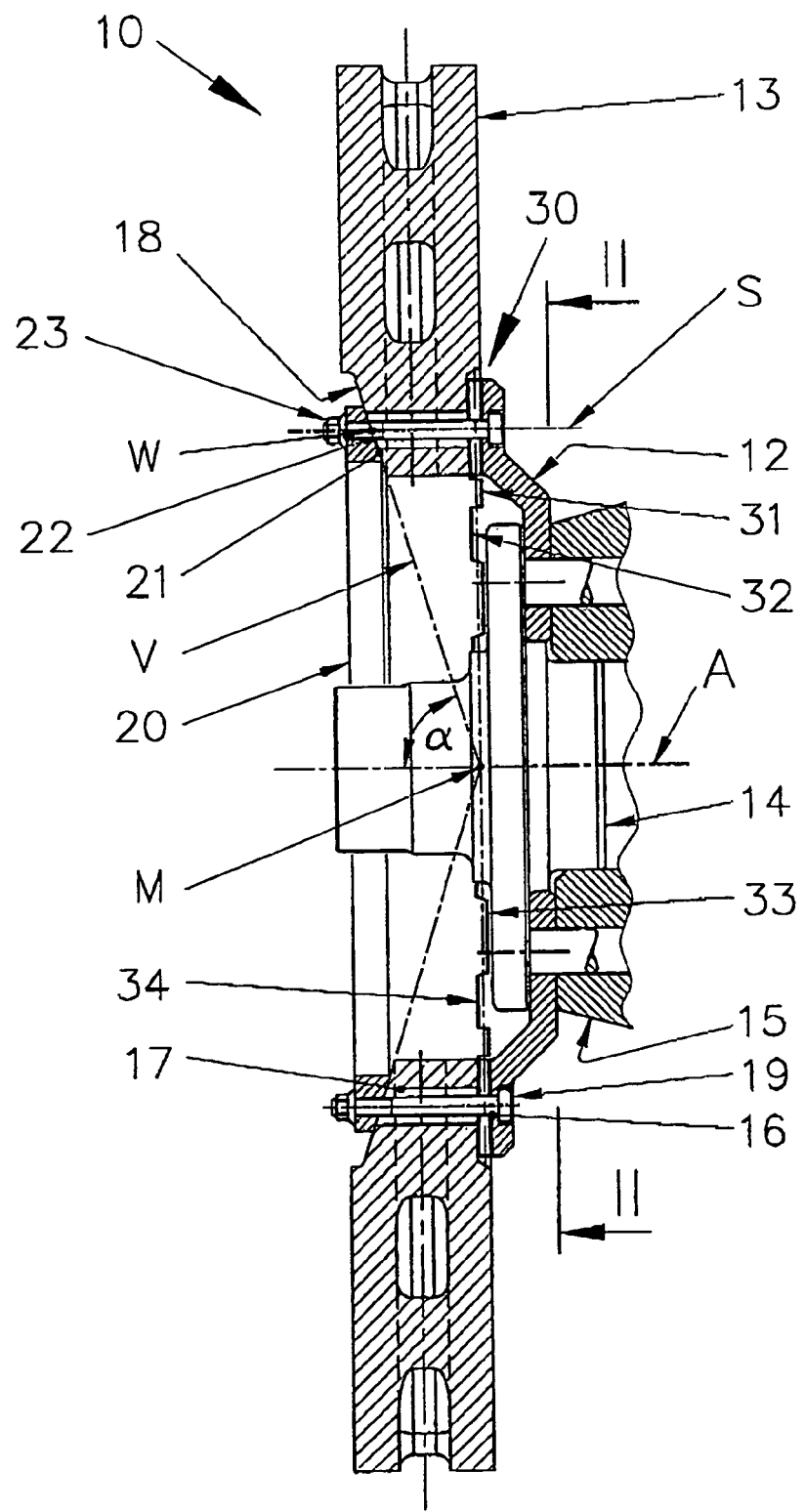
FIG. 1 is a lengthwise section through a disk brake arrangement according to the invention.
Figure 2:
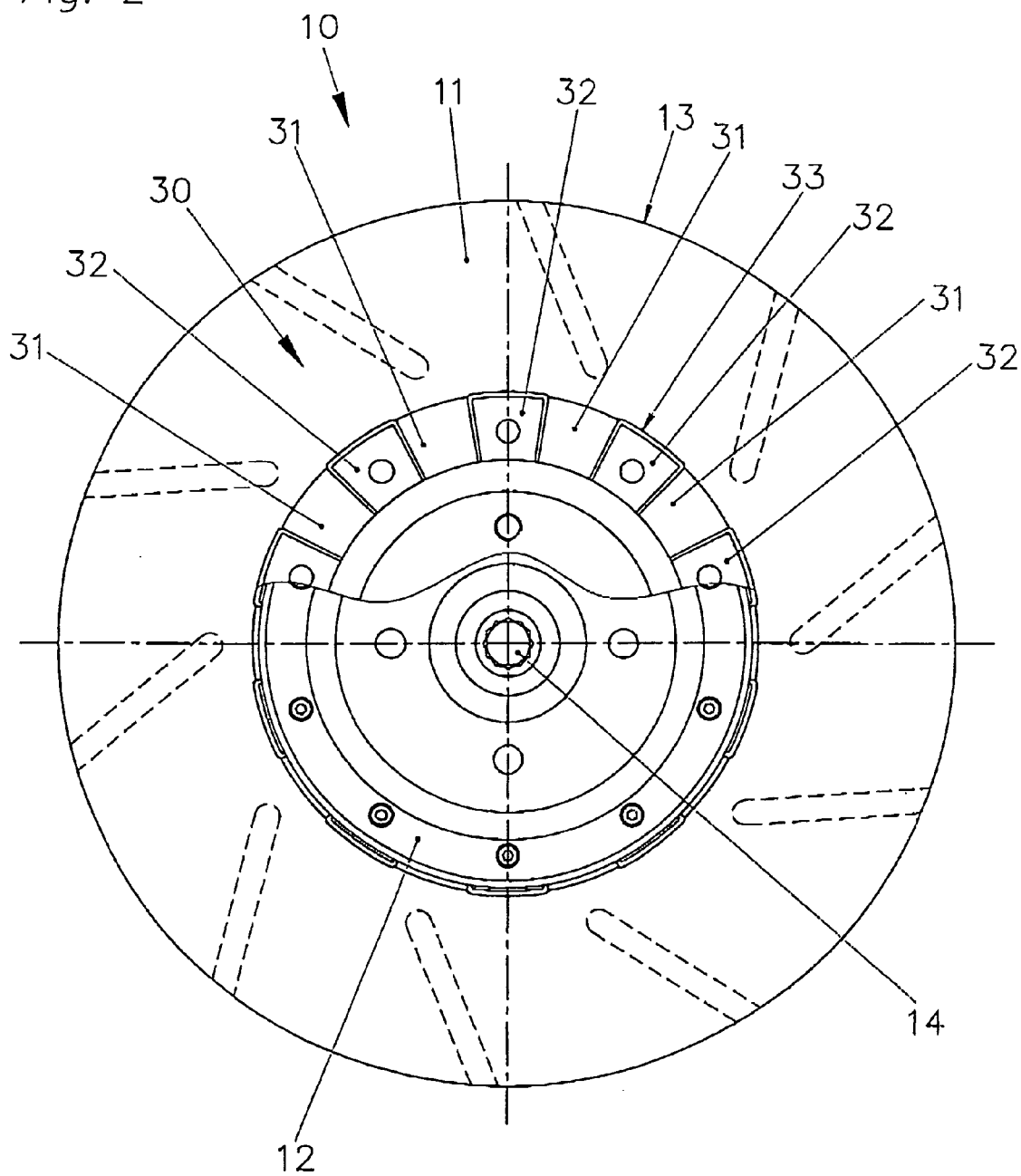
FIG. 2 is a side view of the invented disk brake arrangement taken in the direction of arrow II in FIG. 1, showing a partly cut-away disk brake holder and no wheel.

FIG. 1 shows a disk brake arrangement 10 according to the present invention, cut axially parallel in a radial direction, with brake surfaces 11 (FIG. 2). The disk brake arrangement 10 is configured as a divided disk brake arrangement with a disk holder 12 and a braking disk 13. Disk holder 12 secures the divided disk brake arrangement 10 to a wheel hub 14 between the latter and a wheel 15. Wheel hub 14 and the disk brake arrangement 10 turn about a common rotational axis "A".

Disk holder 12 and braking disk 13 are respectively provided with a spur gearing 33, 34 on their opposing end faces. The spur gearings form a shaft coupling 30, and they are configured as a planar, grooved annular spur gearing, which is described in more detail below. Shaft coupling 30 engages disk holder 12 and braking disks 13 in a torsion-proof manner. Shaft coupling 30, configured as a planar, grooved gearing which centers disk holder 12 and braking disk 13 relative to each other, allows relative radial movement caused by differences in the thermal expansions of disk holder 12 and braking disk 13.

In the region of the annular spur gearings 33, 34, disk holder 12 and braking disk 13 have axially parallel boreholes 16 which are spaced apart from each other and arranged around the periphery. A tensioning screw 19 is disposed in each borehole. Boreholes 17 in braking disk 13 are longitudinal holes which permit expansion in the radial direction.

The side of shaft coupling 30 facing away from braking disk 13 is provided with an annular conical surface 18 which tapers the thickness of braking disk 13 radially inward toward axis "A".

A tensioning ring 20 has a corresponding conical surface 21 that lies against conical surface 18 of braking disk 13. Tensioning ring 20 has a number of threaded holes 22, corresponding to the number of boreholes 16, 17, which are engaged by tensioning screws 19. The heads of the tensioning screws are supported by disk holder 12. A locking nut 23 is screwed onto the threaded portion of each tensioning screw 19 that emerges from threaded hole 22 of the tensioning ring 20 and longitudinally pretensions the screw when the nut is tightened. In this manner, braking disk 13 is clamped between the disk holder 12 and tensioning ring 20.

The angular inclination of the conical surfaces 18 and 21 relative to rotational axis A of disk brake arrangement 10 is defined by a line V from midpoint M, situated on rotational axis A of spur gearing 33 of braking disk 13, configured as a planar annular spur gearing, and a point W where the axis S of tensioning screw 19 intersects conical surface 18 or 21. The axis S of tensioning screw 19 extends through the midpoint of borehole 16 in disk holder 12 and through the midpoint of the associated threaded borehole 22 in tensioning ring 20. The line V and the rotational axis A thus determine the angle α of the cone defined by conical surfaces 18, 21.

Spur gearings 33, 34 of shaft coupling 30 are each configured as so-called Hirth gears or Voith-Hirth gears. Its teeth extend radially outward like rays from the midpoint M situated on the rotational axis A (FIG. 2). The teeth are conically shaped and extend radially and conically outward from the common origin at the midpoint M, and they become increasingly thicker in the direction of the pivot axis A (FIG. 1).

However, spur gearings 33, 34 in the depicted example do not have pointed teeth, as classical Hirth gears have, but are each formed as a block tooth, as can be seen from the individual flattened teeth 31 and tooth roots 32 illustrated in FIG. 1 and also in FIG. 2. These block teeth can be viewed as a Hirth gear on which the pointed teeth and the pointed tooth roots are each flattened.

Due to the radially radiating and conical shape of teeth 31 and tooth roots 32 of the spur gear, disk holder 12 and braking disk 13 in their mounted condition are automatically centered about the rotational axis A.

Disk brake arrangements used on land vehicles or aircraft, or even in stationary applications, sometimes reach very high temperatures (in racecars, up to 1000° C. braking surface temperature), so that not insignificant thermal expansions of the individual parts of the disk brake arrangement 10 occur. If, in a divided disk brake arrangement, as is the case with the invention, the braking disk and the disk holder are made of different materials, they will also expand at different rates. This causes relative movements of the intermeshing spur gearings 33, 34 of shaft coupling 30 in the radial direction.

The radial displacement caused by this relative movement also produces a radial displacement of the tensioning screws 19 in longitudinal holes 17. When, as in the present example, disk holder 12, tensioning ring 20 and tensioning screw 19 are made from the same material, then the tensioning ring 20 will expand radially to the same degree as disk holder 12, so that the axis S of the tensioning screw 19 remains parallel to the rotational axis A during the radial displacement of the tensioning screw 19. Since the conical surface 21 of tensioning ring 20 moves radially outward along conical surface 18 of braking disk 13, the axial spacing between the tensioning ring 20 and the disk holder 12 increases. This increase in spacing corresponds to the thermal expansion of each tensioning screw 19 in the axial direction, so that the pretension of each tensioning screw 19 remains constant during the radial displacement caused by thermal expansion; thus, no unwanted play occurs, in either the hot or the cold state of the disk brake arrangement 10. In this manner, the attachment of a braking disk 13 to a disk holder 12 of a divided disk brake arrangement 10 made from different materials will be free of play over a wide range of temperatures.

The invention is not restricted to the above-described sample embodiment, which merely serves to generally explain the key features of the present invention. The brake arrangement of the present invention can also be included in embodiments other than the above-described one. The device can have special features in such a case, representing a combination of the individual characteristic features of the respective claims.

Reference numbers in the claims, the specification and the drawings serve to facilitate the explanation of the invention and do not restrict the scope of protection.

The invention claimed is:

1. A divided disk brake arrangement comprising
a brake disk (13) with braking surfaces (11), and
a disk holder (12), which is connected to the brake disk (13) in a torsion-proof manner and secured by a screw connection,
the disk holder (12) and the brake disk (13) being mounted so that they can move relative to each other in a radial direction to compensate for different thermal expansions, wherein
at least one conical surface (18) is provided at the brake disk (13) in a region of a screw connection bearing area of said brake disc, and wherein
the brake disk (13) includes a first annular gear (33),
the disk holder (12) includes a second annular gear (34), wherein said first and second annular gears (33, 34) each are a face gear with axially projecting and radially conically extending teeth, and
the first annular gear (33) and the second annular gear (34) mesh with each other and form a shaft coupling (30) which transmits torque from the brake disk (13) to the disk holder (12) whereby the connection between the disk holder (12) and the brake disk (13) is free of play or in which play is substantially reduced in spite of the different thermal expansions and wherein a first side of the brake disk (13) opposite to a second side of the brake disk bearing the first annular gear (33) is provided with said at least one conical surface (18); wherein the screw connection is formed by at least one tensioning screw (19) which extends through the disk holder (12) and the brake disk (13); and
wherein an angular inclination of said at least one conical surface (18) relative to a rotational axis (A) of the disk brake arrangement (10) is defined by a line (V), said line (V) extending from a midpoint (M) of said first and second annular gears (33, 34) to a point (W), where an axis (S) of said at least one tensioning screw (19) intersects said at least one conical surface (18), and wherein said midpoint (M) is defined by an intersection of a plane of said first and second annular gears (33, 34) and their axis of rotation.

2. A divided disk brake arrangement comprising
a brake disk (13) with braking surfaces (11), and
a disk holder (12), which is connected to the brake disk (13) in a torsion-proof manner and secured by a screw connection,
the disk holder (12) and the brake disk (13) being mounted so that they can move relative to each other in a radial direction to compensate for different thermal expansions,
wherein
at least one conical surface (18) is provided at the brake disk (13) in a region of a screw connection bearing area of said brake disc, and wherein
the brake disk (13) includes a first annular gear (33),
the disk holder (12) includes a second annular gear (34), wherein said first and second annular gears (33, 34) each are a face gear with axially projecting and radially conically extending teeth, and
the first annular gear (33) and the second annular gear (34) mesh with each other and form a shaft coupling (30) which transmits torque from the brake disk (13) to the disk holder (12) whereby the connection between the disk holder (12) and the brake disk (13) is free of play or in which play is substantially reduced in spite of the different thermal expansions and wherein a first side of the brake disk (13) opposite to a second side of the brake disk bearing the first annular gear (33) is provided with said at least one conical surface (18);
wherein the screw connection is formed by at least one tensioning screw (19) which extends through the disk holder (12) and the brake disk (13); and
wherein an angular inclination of said at least one conical surface (18) relative to a rotational axis (A) of the disk brake arrangement (10) is defined by a line (V), said line (V) extending from a midpoint (M) of said first and second annular gears (33, 34) to a point (W), where an axis (S) of said at least one tensioning screw (19) intersects said at least one conical surface (18), and wherein said midpoint (M) is defined as the projected common origin of said radially conically extending teeth of said first and second annular gears (33, 34).

3. A divided disk brake arrangement comprising
a brake disk (13) with braking surfaces (11), and
a disk holder (12), which is connected to the brake disk (13) in a torsion-proof manner and secured by a screw connection,
the disk holder (12) and the brake disk (13) being mounted so that they can move relative to each other in a radial direction to compensate for different thermal expansions, wherein
at least one conical surface (18) is provided at the brake disk (13) in a region of a screw connection bearing area of said brake disk, and wherein
the brake disk (13) includes a first annular gear (33),
the disk holder (12) includes a second annular gear (34), wherein said first and second annular gears (33, 34) are each a face gear with axially projecting and radially conically extending teeth, and
the first annular gear (33) and the second annular gear (34) mesh with each other and form a shaft coupling (30) which transmits torque from the brake disk (13) to the disk holder (12) whereby the connection between the disk holder (12) and the brake disk (13) is free of play or in which play is substantially reduced in spite of the different thermal expansions and wherein a first side of the brake disk (13) opposite to a second side of the brake disk bearing the first annular gear (33) is provided with said at least one conical surface (18);
wherein the screw connection is formed by at least one tensioning screw (19) which extends through the disk holder (12) and the brake disk (13) in the region of said first and second annular gears (33, 34).

4. A divided disk brake arrangement according to any one of claims 1, 2, or 3, wherein said first and second gears (34, 35) each have an engagement surface grouped into block teeth (31).

5. A divided disk brake arrangement according to claim 1, wherein a ring (20) is provided on the first side of the brake disk (13) facing axially away from the disk holder (12) and the disk holder (12) is connected to the ring (20) by the at least one tensioning screw (19), the brake disk (13) being clamped between the disk holder (12) and the ring (20).

6. A divided disk brake arrangement according to claim 5, wherein the disk holder (12), the ring (20) and the at least one tensioning screw (19) have the same thermal expansion coefficient.

7. A divided disk brake arrangement according to claim 5, wherein said at least one conical surface (18) of the brake disk (13) is of annular shape and wherein said ring (20) lies against said at least one conical surface (18).

8. A divided disk brake arrangement according to claim 7, wherein a region of the ring (20) against which the brake disk (13) lies defines a conical annular surface (21), and wherein an angular inclination of said conical annular surface (21) of said ring (20) relative to said rotational axis (A) of the disk brake arrangement (10) is the same as said at least one conical surface (18).

9. A divided disk brake arrangement according to claim 2, wherein a ring (20) is provided on the first side of the brake disk (13) facing axially away from the disk holder (12) and the disk holder (12) is connected to the ring (20) by the at least one tensioning screw (19), the brake disk (13) being clamped between the disk holder (12) and the ring (20).

10. A divided disk brake arrangement according to claim 9, wherein the disk holder (12), the ring (20) and the at least one tensioning screw (19) have the same thermal expansion coefficient.

11. A divided disk brake arrangement according to claim 9, wherein said at least one conical surface (18) of the brake disk (13) is of annular shape and wherein said ring (20) lies against said at least one conical surface (18).

12. A divided disk brake arrangement according to claim 11, wherein a region of the ring (20) against which the brake disk (13) lies defines a conical annular surface (21) and wherein an angular inclination of said conical annular surface (21) of said ring (20) relative to said rotational axis (A) of the disk brake arrangement (10) is the same as said at least one conical surface (18).

13. A divided disk brake arrangement according to claim 3, wherein a ring (20) is provided on the first side of the brake disk (13) facing axially away from the disk holder (12) and the disk holder (12) is connected to the ring (20) by the at least one tensioning screw (19), the brake disk (13) being clamped between the disk holder (12) and the ring (20).

14. A divided disk brake arrangement according to claim 13, wherein the disk holder (12), the ring (20) and the at least one tensioning screw (19) have the same thermal expansion coefficient.

15. A divided disk brake arrangement according to claim 13, wherein said at least one conical surface of the brake disk (13) is of annular shape and wherein said ring (20) lies against said at least one conical surface (18).

16. A divided disk brake arrangement according to claim 15, wherein a region of the ring (20) against which the brake disk (13) lies defines a conical annular surface (21) and wherein an angular inclination of said conical annular surface (21) of said ring (20) relative to said rotational axis (A) of the disk brake arrangement (10) is the same as said at least one conical surface (18).

17. A divided disk brake arrangement according to claim 3, wherein the screw connection is formed by at least one tensioning screw (19) which extends through the disk holder (12) and the brake disk (13);

wherein an angular inclination of said at least one conical surface (18) relative to a rotational axis (A) of the disk brake arrangement (10) is defined by a line (V), said line (V) extending from a midpoint (M) of said first and second annular gears (33, 34) to a point (W), where an axis (S) of said at least one tensioning screw (19) intersects said at least one conical surface (18).

18. A divided disk brake arrangement according to claim 17, wherein said midpoint (M) is defined by an intersection of a plane of said first and second annular gears (33, 34) and their axis of rotation.

19. A divided disk brake arrangement according to claim 17, wherein said midpoint (M) is defined as the projected common origin of said radially conically extending teeth of said first and second annular gears (33, 34).

* * * * *